(12) United States Patent
Hashimoto et al.

(10) Patent No.: US 10,927,928 B2
(45) Date of Patent: Feb. 23, 2021

(54) AUXILIARY MACHINE-DRIVING DEVICE FOR VEHICLE

(71) Applicant: Nissan Motor Co., Ltd., Yokohama (JP)

(72) Inventors: Shin Hashimoto, Kanagawa (JP); Kenshi Ushijima, Kanagawa (JP); Takeshi Yamamoto, Kanagawa (JP); Satoshi Gondaira, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 758 days.

(21) Appl. No.: 15/577,361

(22) PCT Filed: Jun. 8, 2015

(86) PCT No.: PCT/JP2015/066452
§ 371 (c)(1),
(2) Date: Nov. 28, 2017

(87) PCT Pub. No.: WO2016/199186
PCT Pub. Date: Dec. 15, 2016

(65) Prior Publication Data
US 2018/0156320 A1     Jun. 7, 2018

(51) Int. Cl.
*F16H 13/04*   (2006.01)
*F02B 39/12*   (2006.01)
(Continued)

(52) U.S. Cl.
CPC ................ *F16H 13/10* (2013.01); *F01P 5/12* (2013.01); *F02B 67/04* (2013.01); *F02N 11/003* (2013.01);
(Continued)

(58) Field of Classification Search
CPC .......... F02B 67/04; F02B 39/04; F02B 39/06; F02B 67/06; F16H 13/04
See application file for complete search history.

(56) References Cited

U.S. PATENT DOCUMENTS 1,416,569 A    5/1922   Minnich
3,202,144 A    8/1965   Nicholson et al.
(Continued)

FOREIGN PATENT DOCUMENTS

CN    202510221 U    10/2012
CN    104541034 A    4/2015
(Continued)

*Primary Examiner* — Long T Tran
(74) *Attorney, Agent, or Firm* — Global IP Counselors, LLP (57) ABSTRACT

An auxiliary machine-driving device has a first idler roller disposed between an engine roller and a first rotating roller; a second idler roller disposed between the first rotating roller and a second rotating roller; a third idler roller disposed between the second rotating roller and the engine roller; and a linking mechanism driven by one actuator to switch the first idler roller between a state in which the first idler roller contacts the engine roller and the first rotating roller, and a state in which the first idler roller separates from the engine roller and the first rotating roller, and to switch at least one of the second and third idler rollers between a state in which the at least one roller contacts two rollers adjacent the at least one roller, and a state in which the at least one roller separates from the two rollers.

2 Claims, 10 Drawing Sheets

(51) Int. Cl.
*F16H 13/10* (2006.01)
*F02B 67/04* (2006.01)
*F01P 5/12* (2006.01)
*F02N 11/00* (2006.01)
*F02N 11/04* (2006.01)

(52) U.S. Cl.
CPC ........ *F16H 13/04* (2013.01); *F01P 2005/125* (2013.01); *F02N 11/04* (2013.01)

(56) References Cited

U.S. PATENT DOCUMENTS

| | | | |
|---|---|---|---|
| 4,981,116 A * | 1/1991 | Trinquard | F02B 67/06 |
| | | | 123/90.31 |
| 6,849,025 B2 | 2/2005 | Chikaraishi et al. | |
| 9,212,605 B2 | 12/2015 | Hashimoto et al. | |
| 9,745,915 B2 * | 8/2017 | Cleeves | F02D 13/0269 |
| 2015/0211414 A1 * | 7/2015 | Hashimoto | B60K 6/36 |
| | | | 74/661 |

FOREIGN PATENT DOCUMENTS

| | | |
|---|---|---|
| DE | 373816 | 4/1923 |
| DE | 10301758 A1 | 8/2004 |
| EP | 1464809 A2 | 10/2004 |
| EP | 1703170 A1 | 9/2006 |
| FR | 2865518 A1 | 7/2005 |
| JP | 2002-201975 | 7/2002 |
| JP | 2008-531946 A | 8/2008 |
| WO | 2004/048808 A1 | 6/2004 |
| WO | 2004048758 A1 | 6/2004 |
| WO | 2014/038554 A1 | 3/2014 |

* cited by examiner

AUXILIARY MACHINE-DRIVING DEVICE FOR VEHICLE

CROSS-REFERENCE TO RELATED APPLICATIONS

This application is a U.S. National stage application of International Application No. PCT/JP2015/066452, filed Jun. 8, 2015.

BACKGROUND

Field of the Invention

The present invention relates to an auxiliary machine-driving device for a vehicle.

Background Information

As the type of technique therefor, the technique described in Japanese Laid-Open Patent Application No. 2008-531946 (Patent Document 1) below has been disclosed. The document discloses a technique in which, by moving the position of a single friction wheel with a single actuator, a state in which the friction wheel comes into contact with both a belt and a driven pulley and a state in which the friction wheel comes into contact with just the belt are switched. Driving with the actuator enables switching between connecting/disconnecting the transmission of torque via the belt onto the driven pulley.

SUMMARY

When enabling the switching between connecting/disconnecting the transmission of torque between a pair of rollers by using the technique described in the above-referenced patent document 1, two or more actuators are required. For this reason, there was the problem of increased cost. In view of the problem described above, an object of the present invention is to provide an auxiliary machine-driving device for a vehicle that reduces the cost by reducing the number of actuators that enable switching between connecting/disconnecting the transmission of torque when enabling the switching between connecting/disconnecting the transmission of torque between a pair of rollers.

The auxiliary machine-driving device for a vehicle is provided with a first idler roller disposed between an engine roller and a first rotating roller, a second idler roller disposed between the first rotating roller and a second rotating roller, a third idler roller disposed between the second rotating roller and the engine roller, and a linking mechanism that is driven by one actuator and that changes the position of the first idler roller so as to switch between a state in which the first idler roller makes contact with outer peripheral surfaces of the engine roller and the first rotating roller, and a state in which the first idler roller is separated from the engine roller and the first rotating roller, and that also changes the position of the second idler roller and/or the third idler roller so as to switch between a state in which at least one of the second idler roller and the third idler roller makes contact, at the outer peripheral surfaces, with two rollers that are adjacent to said at least one roller, and a state in which said at least one roller is separated from the two adjacent rollers.

Therefore, with the present invention, the number of actuators can be suppressed and the cost can be reduced.

BRIEF DESCRIPTION OF THE DRAWINGS

Referring now to the drawings, an auxiliary machine-driving device is illustrated for a vehicle.

DETAILED DESCRIPTION OF THE EMBODIMENTS

A preferred embodiment an auxiliary machine-driving device for a vehicle is described below based on the embodiment illustrated in the drawings.

First Embodiment

Figure 1:
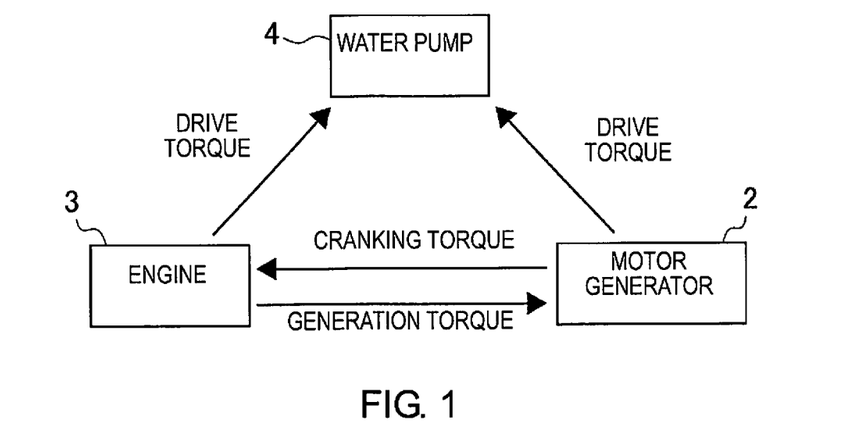
FIG. 1 is a schematic system block diagram of the auxiliary machine-driving device for a vehicle in a first embodiment.
Figure 2:
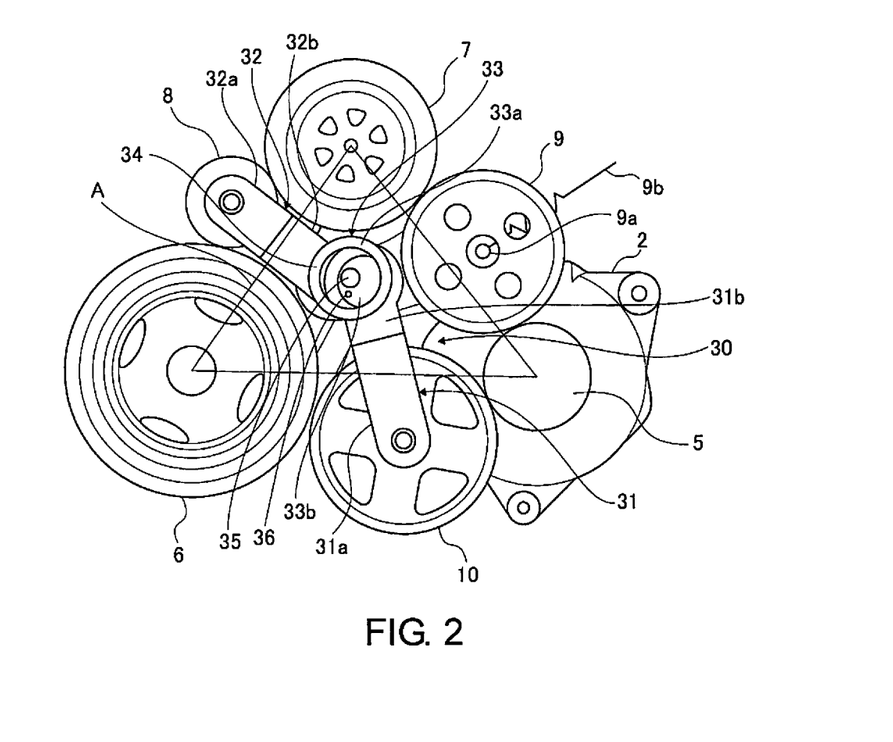
FIG. 2 is a schematic view illustrating the auxiliary machine-driving device for a vehicle of the first embodiment.

The auxiliary machine-driving device 1 for a vehicle of the first embodiment will now be described. FIG. 1 is a schematic system block diagram of the auxiliary machine-driving device for a vehicle of the first embodiment. FIG. 2 is a schematic view illustrating the auxiliary machine-driving device for a vehicle of the first embodiment.

The auxiliary machine-driving device 1 for a vehicle transmits cranking torque from a motor/generator 2 to an engine 3 at the time of an engine start. The engine 3 is started by the cranking torque.

The auxiliary machine-driving device 1 for a vehicle transmits a power generation torque from the engine 3 to the motor/generator 2 after an engine start. The motor/generator 2 generates power with the power generation torque and provides electric power to batteries and electrical equipment. The auxiliary machine-driving device 1 for a vehicle transmits a drive torque from the engine 3 to the water pump 4 after an engine start. The water pump 4 is driven by the drive torque, and cooling water is provided from the water pump 4 to the engine 3. The engine 3 is cooled with the supplied cooling water. In addition, air is warmed using the cooling water that is warmed by the heat from the engine 3 to enable the use of the heater of the air conditioner.

The auxiliary machine-driving device 1 for a vehicle transmits drive torque from the motor/generator 2 to the water pump 4 when the engine is stopped. The water pump 4 is driven by the drive torque, and cooling water is provided from the water pump 4 to the engine 3. Air is warmed using the cooling water that is warmed by the heat from the engine 3 to enable the use of the heater of the air conditioner, even when the engine is stopped.

The auxiliary machine-driving device 1 for a vehicle carries out the transmission of torque using a friction drive that makes use of a wedging effect. The auxiliary machine-driving device 1 for a vehicle comprises a motor/generator roller 5 that integrally rotates with a drive shaft of the motor/generator 2, an engine roller 6 that integrally rotates with a crankshaft of the engine 3, and a water pump roller 7 that integrally rotates with a drive shaft of the water pump 4.

The motor/generator roller 5, the engine roller 6, and the water pump roller 7 are arranged so that the order will be the engine roller 6, the water pump roller 7 and the motor/generator roller 5 in the direction of rotation (clockwise direction in FIG. 2) of the engine roller 6.

Between the engine roller 6 and the water pump roller 7, a first idler roller 8 that comes into contact with the outer peripheral surfaces of the two is provided. The first idler roller 8 is supported by a linking mechanism 30, which is described below, so as to be able to turn freely.

Between the water pump roller 7 and the motor/generator roller 5, a second idler roller 9 that comes into contact with the outer peripheral surfaces of the two is provided. The second idler roller 9 is supported at a rotational center part via a bearing 9a so as to be able to turn freely. The second idler roller 9 is biased in the direction in which the idler roller comes into contact with the outer peripheral surfaces of the water pump roller 7 and the motor/generator roller 5 by a biasing member 9b.

Between the motor/generator roller 5 and the engine roller 6, a third idler roller 10 that comes into contact with the outer peripheral surfaces of the two is provided. The third idler roller 10 is supported by a linking mechanism 30 that is described below so as to be able to turn freely.

The biasing force of the second idler roller 9, due to the biasing member 9b, against the motor/generator roller 5 and the water pump roller 7 is sufficient if the second idler roller 9 is not separated from the motor/generator roller 5 and the water pump roller 7.

The first idler roller 8, the second idler roller 9, and the third idler roller 10 are provided so that the rotational centers of the first idler roller 8, the second idler roller 9, and the third idler roller 10 are positioned outside of a triangle A that is formed by connecting the rotational centers of the motor/generator roller 5, the engine roller 6, and the water pump roller 7.

The outer peripheral surfaces of the motor/generator roller 5, the engine roller 6 and the water pump roller 7 are formed from an iron-based metal. The outer peripheral surfaces of the first idler roller 8, the second idler roller 9 and the third idler roller 10 are formed from a resin.

The hardness of the resin that is used to form the outer peripheral surfaces of the first idler roller 8, the second idler roller 9 and the third idler roller 10 is less than the hardness of the iron-based metal that forms the outer peripheral surfaces of the motor/generator roller 5, the engine roller 6 and the water pump roller 7.

The strength of the resin that is used to form the outer peripheral surfaces of the first idler roller 8, the second idler roller 9 and the third idler roller 10 is less than the strength of the iron-based metal that forms the outer peripheral surfaces of the motor/generator roller 5, the engine roller 6 and the water pump roller 7.

The material that is used as the resin to form the outer peripheral surfaces of the first idler roller 8, the second idler roller 9 and the third idler roller 10 is such that the coefficients of dynamic friction between the outer peripheral surfaces of the motor/generator roller 5, the engine roller 6 and the water pump roller 7 and the outer peripheral surfaces of the first idler roller 8, the second idler roller 9 and the third idler roller 10 are 0.3 or greater.

Wedging Effect

In the auxiliary machine-driving device 1 for a vehicle of the first embodiment, the transmission of torque between two rollers is carried out by a force acting in the direction in which an idler roller bites in between the two rollers in contact with the idler roller, thereby generating a wedging effect. The motion of each roller when the wedging effect is generated will be described below.

Figure 3:
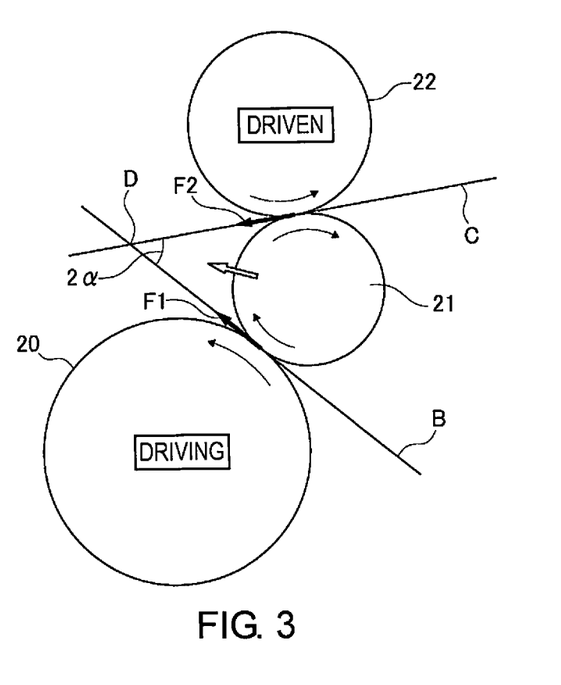
FIG. 3 is a schematic view of the auxiliary machine-driving device for a vehicle of the first embodiment.

FIG. 3 is a schematic view of the auxiliary machine-driving device 1 for a vehicle of the first embodiment. FIG. 3 illustrates the manner in which the torque from a first roller 20 is transmitted to a second roller 22 via an idler roller 21. A line B tangent to the first roller 20 and the idler roller 21 and a line C tangent to the idler roller 21 and the second roller 22 intersect at point D. The size of the angle formed by the tangent line B and the tangent line C is 2a.

The torque of the first roller 20 is transmitted to the idler roller 21. In FIG. 3, when the first roller 20 rotates to the left, the idler roller 21 in contact with the first roller 20 rotates to the right. At this time, the idler roller 21 is pushed in the direction of rotation of the first roller 20 at the point of contact with the first roller 20. A force in the same direction as the direction of rotation of the first roller 20 acts on the idler roller 21 at the point of contact with the first roller 20 (force F1).

The torque of the idler roller 21 is transmitted to the second roller 22. In FIG. 3, when the idler roller 21 rotates to the right, the second roller 22 in contact with the idler roller 21 rotates to the left. At this time, the second roller 22 is pushed in the direction of rotation of the idler roller 21 at the point of contact with the idler roller 21. A reaction force in the direction opposite to the direction in which the second roller 22 is pushed acts on the idler roller 21 at the point of contact with the second roller 22 (force F2).

A force in the direction towards point D acts on the idler roller 21 because of the force F1 and the force F2. For this reason, the contact load of the idler roller 21 against the first roller 20 and the second roller 22 is increased, and the torque can be transmitted from the first roller 20 to the second roller 22 via the idler roller 21.

The larger the load of the second roller 22 becomes (the larger the torque transmitted from the first roller 20 to the second roller 22 becomes), the larger the force in the direction towards point D that acts on the idler roller 21 becomes. The friction force F between the first roller 20 and the idler roller 21, or the friction force F between the idler roller 21 and the second roller 22, can be obtained by the following formula.

$$F = \tau \times A$$

Here, $\tau$ is the shear stress between the first roller 20 and the idler roller 21, or the shear stress between the idler roller 21 and the second roller 22. A is the contact area of the first roller 20 and the idler roller 21, or the contact area of the idler roller 21 and the second roller 22.

The shear stress τ is determined by the materials of the contact surface of the first roller 20 and the idler roller 21 and the materials of the contact surface of the idler roller 21 and the second roller 22. The contact area A has a high correlation with the contact load of the idler roller 21 against the first roller 20 and the second roller 22 when the aforementioned resin is used for the outer peripheral surface of the idler roller 21, and the greater the contact load, the greater the contact area A.

Figure 4:
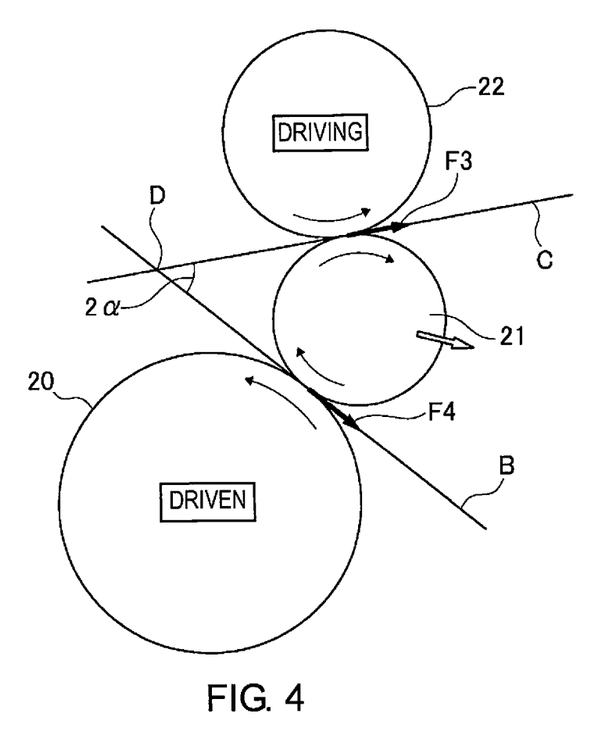
FIG. 4 is a schematic view of the auxiliary machine-driving device for a vehicle of the first embodiment.

FIG. 4 is a schematic view of the auxiliary machine-driving device 1 for a vehicle of the first embodiment. FIG. 4 illustrates the manner in which the torque from the second roller 22 to the first roller 20 is blocked. The torque of the second roller 22 is transmitted to the idler roller 21. In FIG. 4, when the second roller 22 rotates to the left, the idler roller 21 in contact with the second roller 22 rotates to the right. At this time, the idler roller 21 is pushed in the direction of rotation of the second roller 22 at the point of contact with the second roller 22. A force in the same direction as the direction of rotation of the second roller 22 acts on the idler roller 21 at the point of contact with the second roller 22 (force F3).

The torque of the idler roller 21 is transmitted to the first roller 20. In FIG. 4, when the idler roller 21 rotates to the right, the first roller 20 in contact with the idler roller 21 rotates to the left. At this time, the first roller 20 is pushed in the direction of rotation of the idler roller 21 at the point of contact with the idler roller 21. A reaction force in the direction opposite to the direction in which the first roller 20 is pushed acts on the idler roller 21 at the point of contact with the first roller 20 (force F4).

A force in the direction away from point D acts on the idler roller 21 due to the force F3 and the force F4. For this reason, the contact load of the idler roller 21 against the first roller 20 and the second roller 22 decreases. Thus, the transmission of the torque from the second roller 22 to the idler roller 21 and the transmission of the torque from the idler roller 21 to the first roller 20 are hardly carried out.

In order to generate a wedging effect as described above, the positional relationship of the first roller 20, the idler roller 21 and the second roller 22 must satisfy the following formula.

$$\mu > \tan \alpha$$

Here, μ is the coefficient of dynamic friction between the first roller 20 and the idler roller 21, and the coefficient of dynamic friction between the idler roller 21 and the second roller 22.

Configuration of the Linking Mechanism

The first idler roller 8 and the third idler roller 10 are supported by the linking mechanism 30 to be freely rotatable. The first idler roller 8 and the third idler roller 10 switch the contact/separation state of the first idler roller 8 with the engine roller 6 and the water pump roller 7, as well as switch the contact/separation state of the third idler roller 10 with the motor/generator roller 5 and the engine roller 6, in accordance with the motion of the linking mechanism 30.

Figure 5:
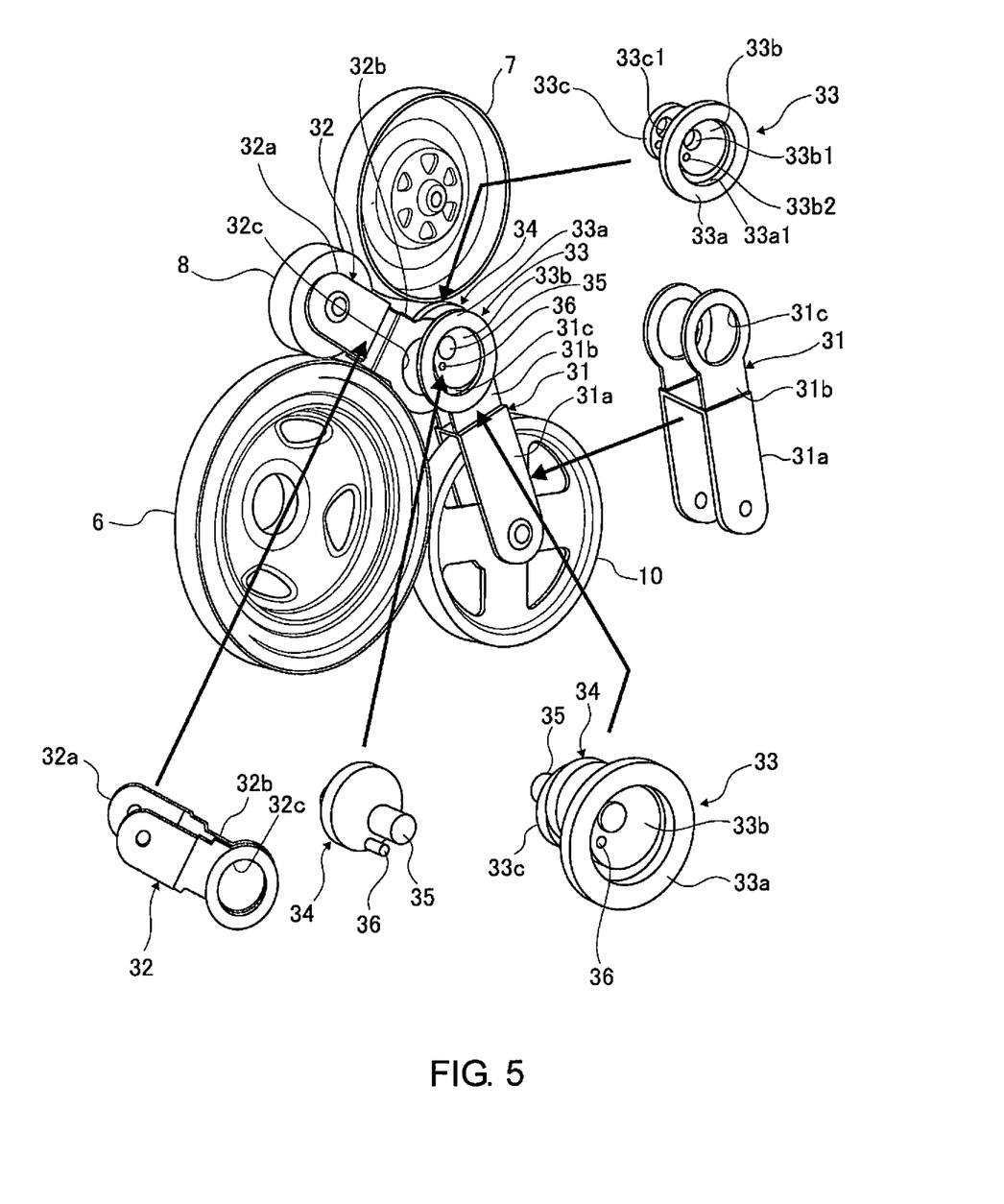
FIG. 5 is a perspective view illustrating the linking mechanism of the first embodiment.
Figure 6:
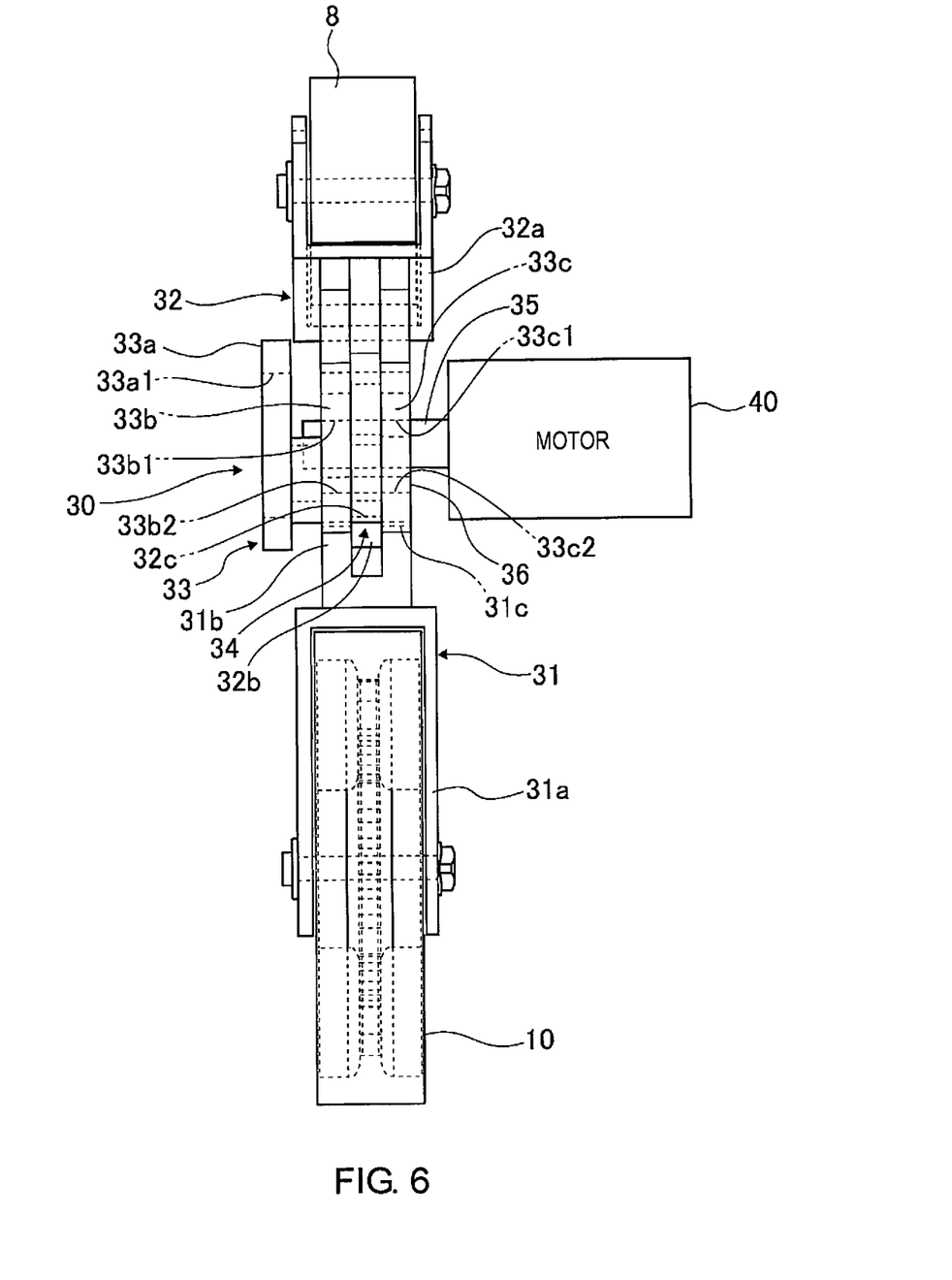
FIG. 6 is a view illustrating the linking mechanism of the first embodiment.
Figure 7A:
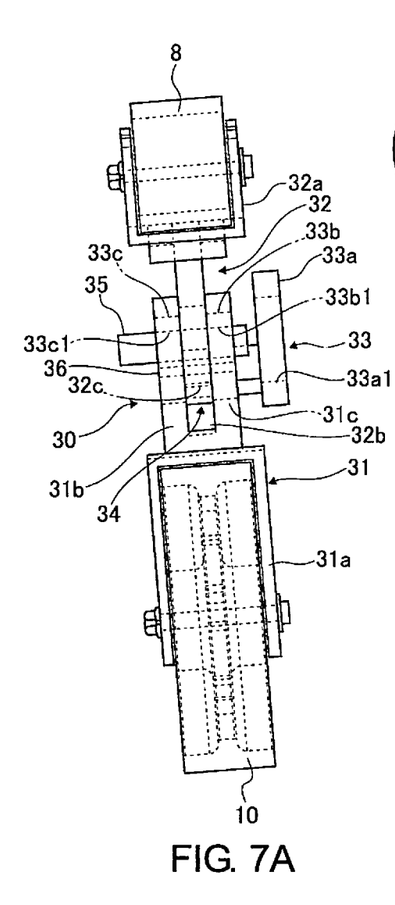
FIGS. 7A, 7B and 7C are a series of views illustrating the linking mechanism of the first embodiment.
Figure 7B:
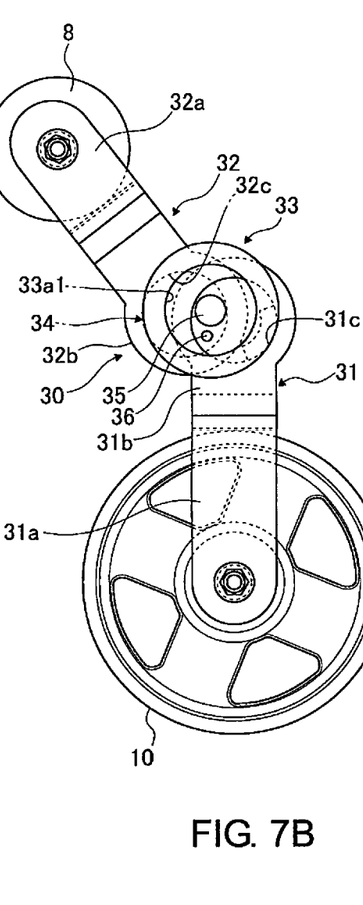
Figure 7C:
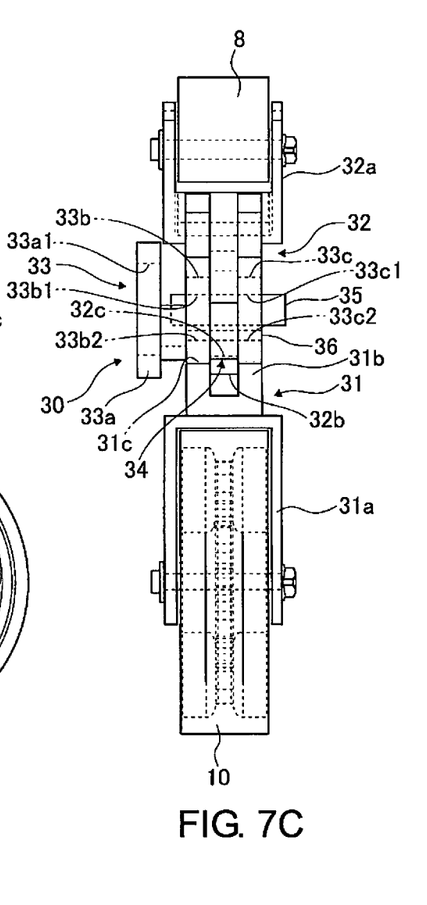
Figure 8:
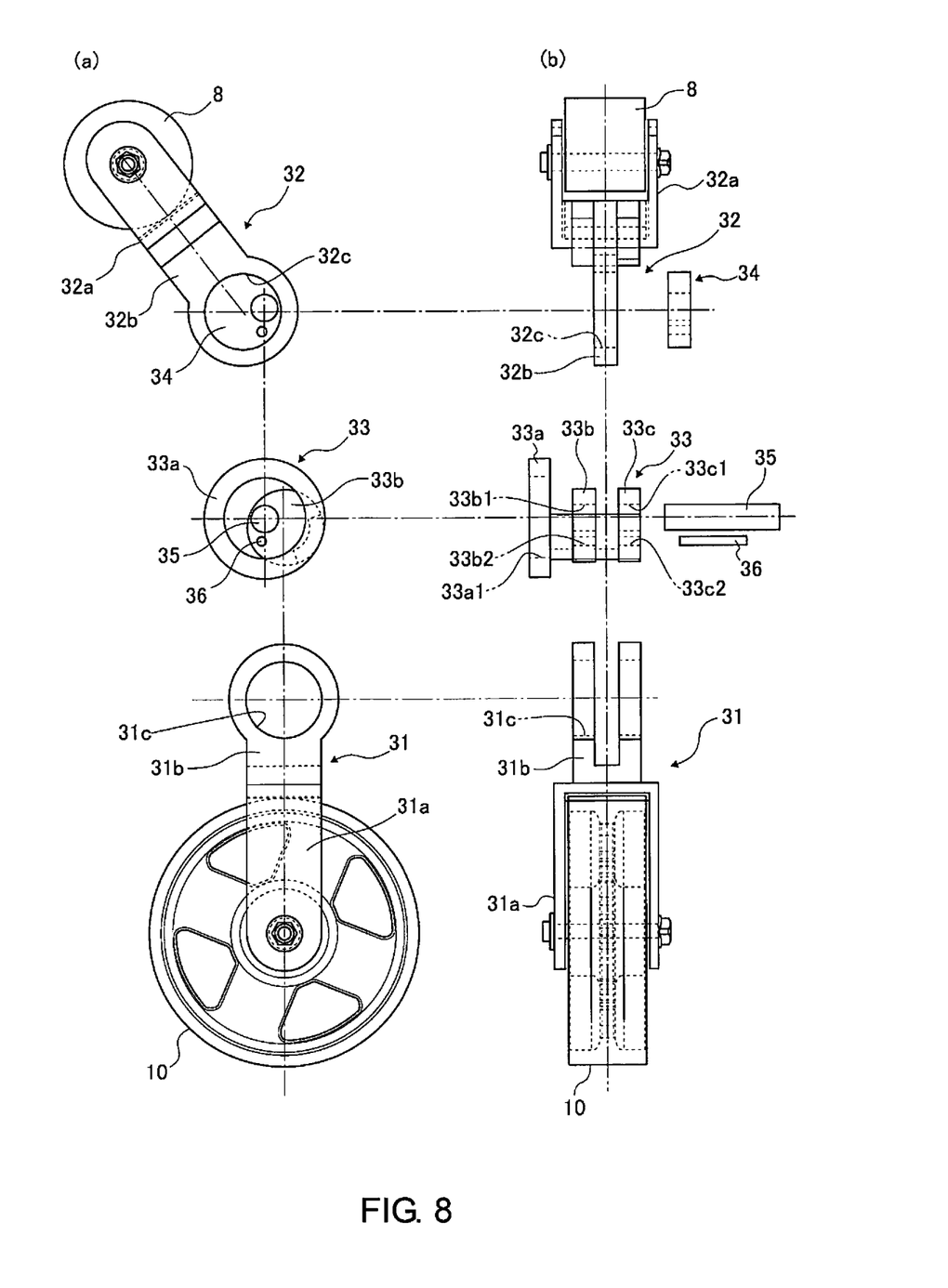
FIG. 8 is a series of views illustrating the linking mechanism of the first embodiment with the linking mechanism disassembled into its various components.

FIG. 5 is a perspective view illustrating the engine roller 6, the water pump roller 7, the first idler roller 8, the third idler roller 10, and the linking mechanism 30, as well as a perspective view of the members of the linking mechanism 30. FIG. 6 is a view illustrating the state in which a motor 40 that drives the linking mechanism 30 is attached to the linking mechanism 30. FIGS. 7A to 7C are a series of views of the linking mechanism 30 from several directions. FIG. 8 is a series of views of the linking mechanism 30 disassembled into its various components.

The linking mechanism 30 comprises a first fork 31, a second fork 32, a first eccentric shaft 33, a second eccentric shaft 34, a pivot shaft 35, and a coupling pin 36. One end of the first fork 31 is forked into two parts, between which a roller retaining part 31a, which retains the third idler roller 10, is formed. The other end of the first fork 31 is also forked into two parts, between which an inserted part 31b, into which the second fork 32 is inserted, is formed. A through-hole penetrating both of the forked members is formed in the inserted part 31b, and the through-hole constitutes an eccentric shaft retaining part 31c that retains the first eccentric shaft 33.

One end of the second fork 32 is forked into two parts, between which a roller retaining part 32a, which retains the first idler roller 8, is formed. The other end of the second fork 32 is a single plate, at the tip of which an insertion part 32b, which is inserted into the inserted part 31b of the first fork 31 that is forked into two parts, is formed. A through-hole that penetrates the insertion part 32b is formed, and the through-hole constitutes an eccentric shaft retaining part 32c that retains the second eccentric shaft 34.

The first eccentric shaft 33 is formed with a shape that integrally connects three disk-shaped members. The three disk-shaped members are a large diameter part 33a, a first small diameter part 33b, and a second small diameter part 33c. The three members are integrally formed in a state in which the first small diameter part 33b and the second small diameter part 33c are eccentric with respect to the center axis of the large diameter part 33a. The center axis of the first small diameter part 33b and the center axis of the second small diameter part 33c are concentrically disposed. The first small diameter part 33b and the second small diameter part 33c are inserted into the eccentric shaft retaining part 31c of the first fork 31 and are fixed with respect to the first fork 31.

A through-hole 33a1 having an inner diameter concentric with the center axis of the large diameter part 33a is formed in the large diameter part 33a. Two through-holes are formed in the first small diameter part 33b and the second small diameter part 33c. One forms shaft insertion holes 33b1 and 33c1, into which the pivot shaft 35 is inserted, and the other forms pin insertion holes 33b2 and 33c2, into which the coupling pin 36 is inserted. Shaft insertion holes 33b1 and 33c1 are disposed in eccentric positions with respect to the center axis of the first small diameter part 33b and the second small diameter part 33c.

The second eccentric shaft 34 is a disk-shaped member. Two through-holes are formed in the second eccentric shaft 34. One is a shaft insertion hole 34a, into which the pivot shaft 35 is inserted, and the other is a pin insertion hole 34b, into which the coupling pin 36 is inserted. The shaft insertion hole 34a is disposed in an eccentric position with respect to the center axis of the second eccentric shaft 34. The second eccentric shaft 34 is inserted into the eccentric shaft retaining part 32c of the second fork 32 and is fixed with respect to the second fork 32.

The first eccentric shaft 33 and the second eccentric shaft 34 are coupled by the pivot shaft 35 and the coupling pin 36. When the pivot shaft 35 rotates, the first eccentric shaft 33 and the second eccentric shaft 34 integrally rotate about the axis of rotation of the pivot shaft 35.

Motions of the Linking Mechanism

Figure 9A:
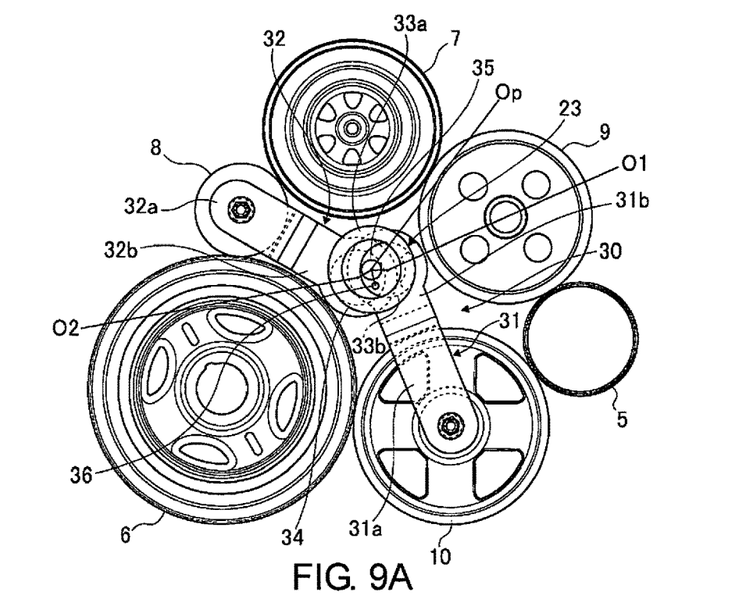
FIGS. 9A and 9B are a pair of views illustrating the motions of the linking mechanism of the first embodiment.
Figure 9B:
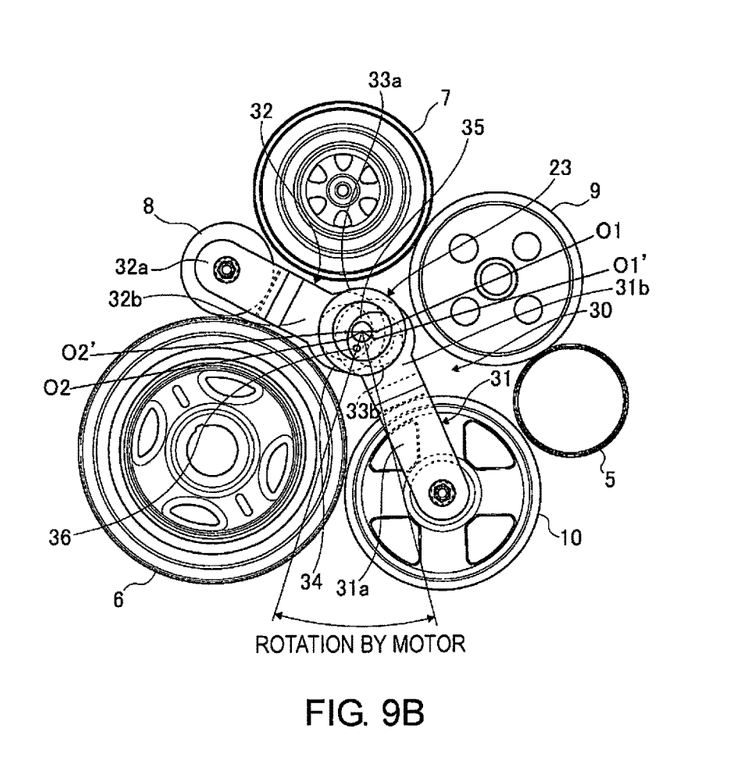

FIGS. 9A and 9B are a pair of views illustrating the motions of the linking mechanism 30. FIG. 9A is a view illustrating a state in which the first idler roller 8 is in contact with the engine roller 6 and the water pump roller 7, and the third idler roller 10 is in contact with the motor/generator roller 5 and the engine roller 6. FIG. 9B is a view illustrating a state in which the first idler roller 8 is separated from the engine roller 6 and the water pump roller 7, and the third idler roller 10 is separated from the motor/generator roller 5 and the engine roller 6.

In FIGS. 9A and 9B, the axis of rotation of the pivot shaft 35 is Op, the center axis of the first small diameter part 33b and the second small diameter part 33c of the first eccentric shaft 33 is O1, and the center axis of the second eccentric shaft 34 is O2. In FIGS. 9A and 9B, when the pivot shaft 35 rotates to the right, the center axis of the first small diameter part 33b and the second small diameter part 33c of the first eccentric shaft 33 is moved from position O1 to O1', and the center axis of the second eccentric shaft 34 is moved from position O2 to O2'.

The first small diameter part 33b and the second small diameter part 33c of the first eccentric shaft 33 are fixed with respect to the first fork 31. For this reason, the first fork 31 also moves insofar as the center axis moves from O1 to O1'. Thus, the first fork 31 moves the first idler roller 8 away from the engine roller 6 and the water pump roller 7.

The second eccentric shaft 34 is fixed with respect to the second fork 32. For this reason, the second fork 32 also moves insofar as the center axis moves from O2 to O2'. Thus, the second fork 32 moves the third idler roller 10 away from the motor/generator roller 5 and the engine roller 6.

Behavior of the Auxiliary Machine-Driving Device

Figure 10:
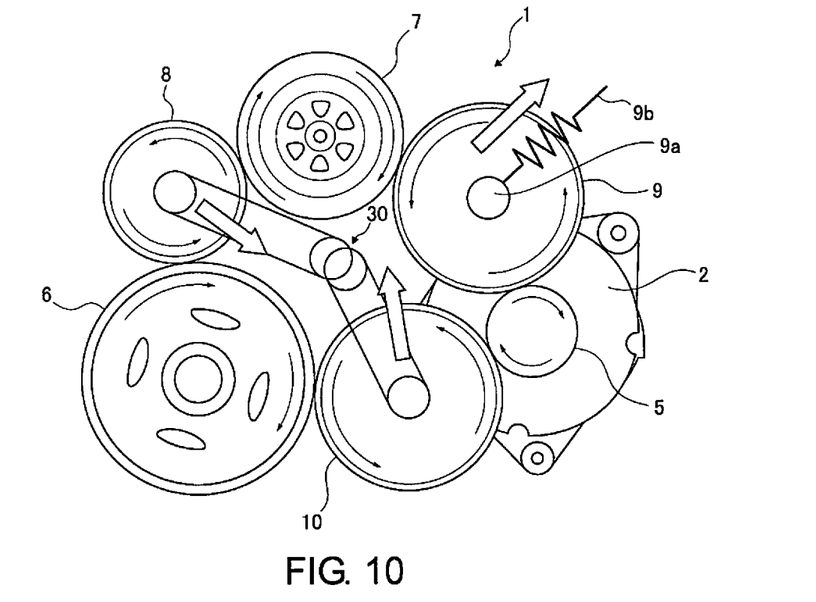
FIG. 10 is a view illustrating the motions of the members of the auxiliary machine-driving device for a vehicle of the first embodiment at the time of an engine start.

FIG. 10 is a view illustrating the motions of the members of the auxiliary machine-driving device 1 for a vehicle at the time of an engine start. When the engine starts, the cranking of the engine 3 is carried out by the drive torque of the motor/generator 2.

At the time of an engine start, the first idler roller 8 is made to come into contact with the engine roller 6 and the water pump roller 7, and the third idler roller 10 is made to come into contact with the motor/generator roller 5 and the engine roller 6, by the linking mechanism 30.

The motor/generator roller 2 is driven, and the motor/generator roller 5 is rotated to the right in FIG. 10. The third idler roller 10 is rotated to the left by the motor/generator roller 5, and the engine roller 6 is rotated to the right by the third idler roller 10. At this time, a force acts on the third idler roller 10 in the direction in which the idler roller bites in between the motor/generator roller 5 and the engine roller 6. As a result, the drive torque of the motor/generator 2 is transmitted to the engine 3 via the third idler roller 10.

The engine roller 6 is rotated to the right due to the drive torque from the motor/generator roller 5. The first idler roller 8 is rotated to the left by the engine roller 6, and the water pump roller 7 is rotated to the right by the first idler roller 8. At this time, a force acts on the first idler roller 8 in the direction in which the idler roller bites in between the engine roller 6 and the water pump roller 7. As a result, part of the drive torque that is transmitted from the motor/generator roller 5 to the engine roller 6 is transmitted to the water pump roller 7 via the first idler roller 8.

The second idler roller 9 is rotated to the left by the motor/generator roller 5, and the water pump roller 7 is rotated to the right by the second idler roller 9. At this time, a force acts on the second idler roller 9 in the direction away from the line of contact between the motor/generator roller 5 and the water pump roller 7. As a result, the torque from the motor/generator roller 5 to the water pump roller 7 via the second idler roller 9 is hardly transmitted.

Figure 11:
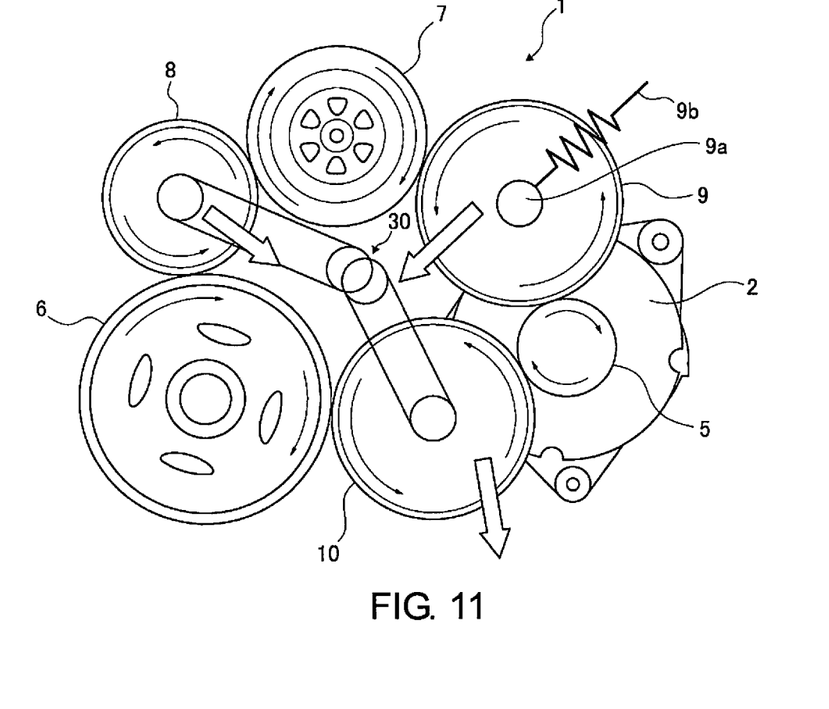
FIG. 11 is a view illustrating the motions of the members of the auxiliary machine-driving device for a vehicle of the first embodiment after an engine start.

FIG. 11 is a view illustrating the motions of the members of the auxiliary machine-driving device 1 for a vehicle after an engine start. After the engine starts, the motor/generator 2 generates power with the torque of the engine 3.

After the engine starts, also, the first idler roller 8 is made to come into contact with the engine roller 6 and the water pump roller 7, and the third idler roller 10 is made to come into contact with the motor/generator roller 5 and the engine roller 6, by the linking mechanism 30.

In FIG. 11, the engine roller 6 is rotated to the right by the drive torque of the engine 3. The first idler roller 8 is rotated to the left by the engine roller 6, and the water pump roller 7 is rotated to the right by the first idler roller 8. At this time, a force acts on the first idler roller 8 in the direction in which the idler roller bites in between the engine roller 6 and the water pump roller 7. As a result, the drive torque of the engine roller 6 is transmitted to the water pump roller 7 via the first idler roller 8.

The water pump roller 7 is rotated to the right by the torque from the engine roller 6. The second idler roller 9 is rotated to the left by the water pump roller 7, and the motor/generator roller 5 is rotated to the right by the second idler roller 9. At this time, a force acts on the second idler roller 9 in the direction in which the idler roller bites in between the water pump roller 7 and the motor/generator roller 5. As a result, part of the torque transmitted from the engine roller 6 to the water pump roller 7 is transmitted to the motor/generator roller 5 via the second idler roller 9.

The third idler roller 10 is rotated to the left by the engine roller 6, and the motor/generator roller 5 is rotated to the right by the second idler roller 9. At this time, a force acts on the third idler roller 10 in the direction away from the line of contact between the engine roller 6 and the motor/generator roller 5. As a result, the torque from the engine roller 6 to the motor/generator roller 5 via the third idler roller 10 is hardly transmitted.

Figure 12:
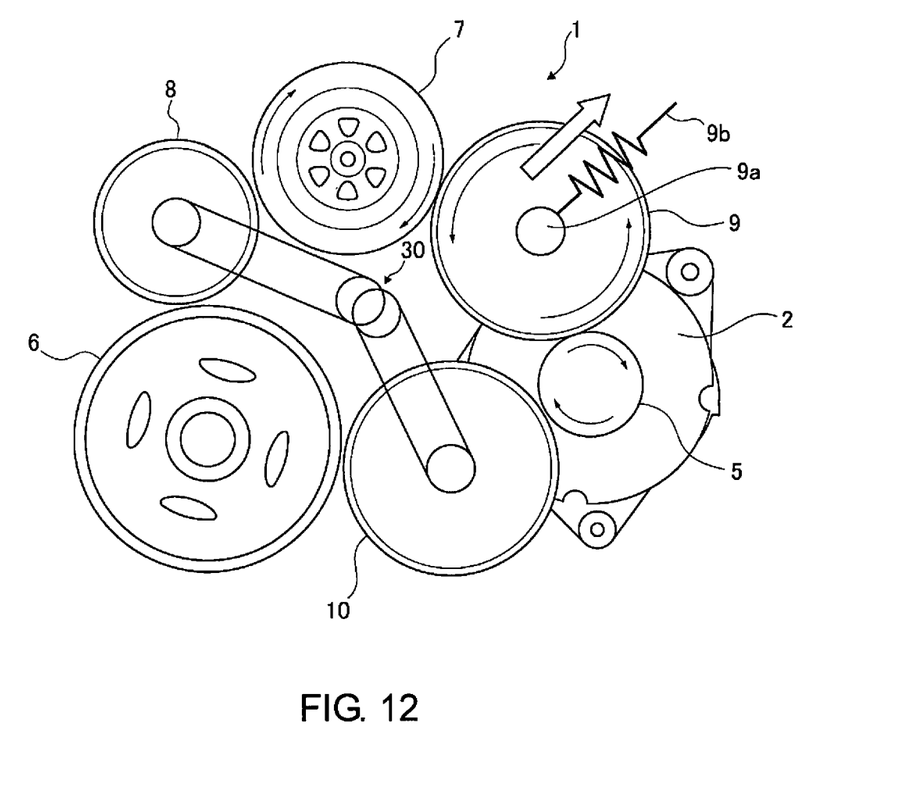
FIG. 12 is a view illustrating the motions of the members of the auxiliary machine-driving device for a vehicle of the first embodiment when the engine is stopped.

FIG. 12 is a view illustrating the motions of the members of the auxiliary machine-driving device 1 for a vehicle when the engine is stopped. When the engine is stopped, the water pump 4 is driven by the motor/generator 2.

When the engine is stopped, the first idler roller 8 is separated from the engine roller 6 and the water pump roller 7, and the third idler roller 10 is separated from the motor/generator roller 5 and the engine roller 6, by the linking mechanism 30.

The motor/generator roller 2 is driven, and the motor/generator roller 5 is rotated to the right in FIG. 12. The second idler roller 9 is rotated to the left by the motor/generator roller 5, and the water pump roller 7 is rotated to the right by the second idler roller 9. At this time, a force acts on the second idler roller 9 in the direction away from the line of contact between the motor/generator roller 5 and the water pump roller 7, and the wedging effect cannot be effected. However, since the load of the water pump 4 is not large, the water pump 4 can be sufficiently driven even if the wedging effect does not occur, and cooling water is supplied to the engine 3 from the water pump 4.

Configuration of the Water Circuit

Figure 13:
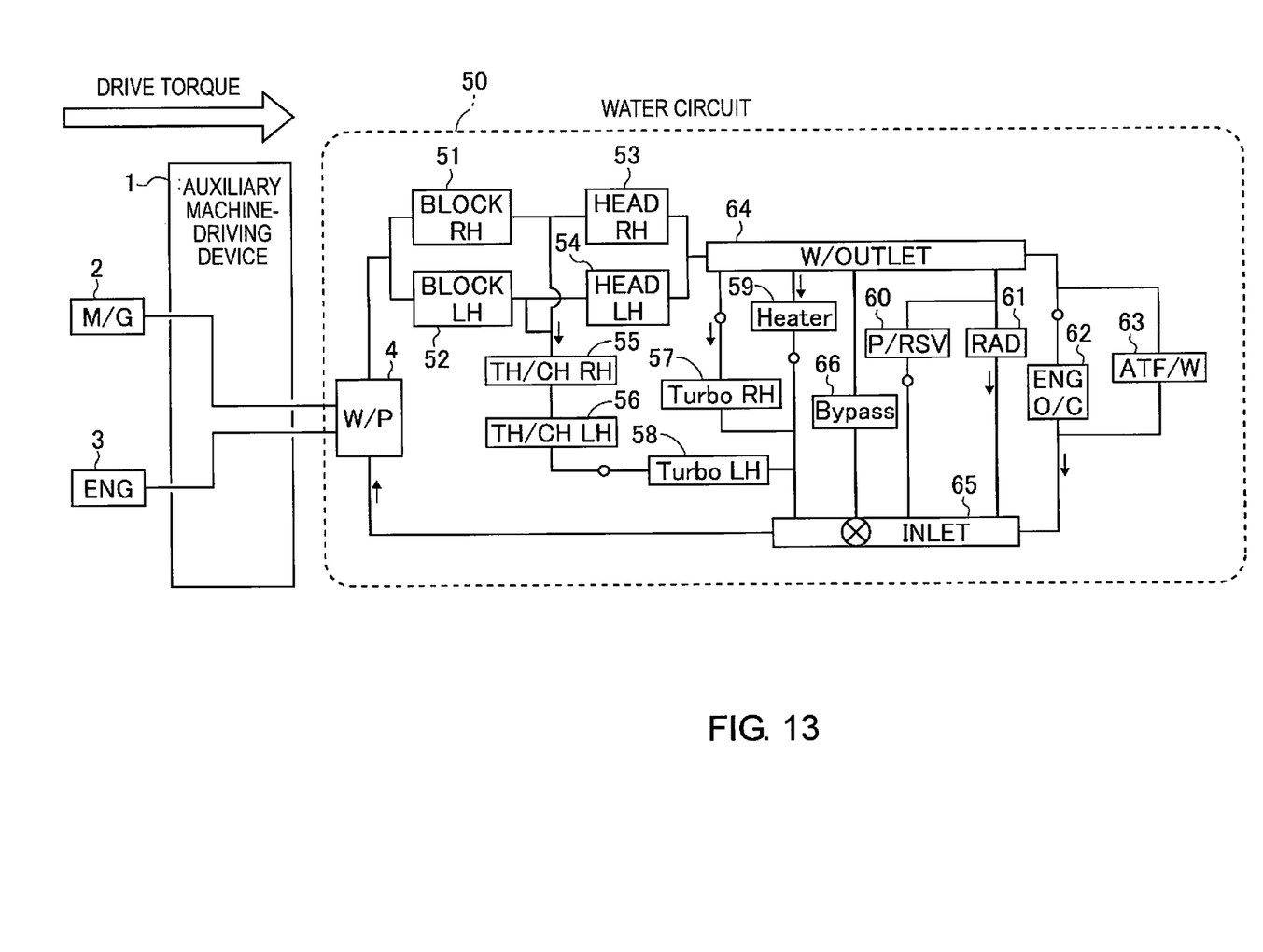
FIG. 13 is a view illustrating the water circuit of the cooling water.

FIG. 13 is a view illustrating the water circuit 50 of the cooling water. The water pump 4 is driven by the engine 3 after the engine starts, and is driven by the motor/generator 2 when the engine is stopped.

The cooling water discharged from the water pump 4 is first supplied to a right cylinder block 51 and a left cylinder block 52. The cooling water that has passed through the right cylinder block 51 is sent to a right cylinder head 53 and a right throttle chamber 55. The cooling water that has passed through the left cylinder block 52 is sent to a left cylinder head 54 and the right throttle chamber 55.

The cooling water that has passed through the right throttle chamber 55 is sent to a left throttle chamber 56. The cooling water that has passed through the left throttle chamber 56 is sent to a left turbocharger 58. The cooling water that has passed through the left turbocharger 58 is sent to a water inlet 65.

The cooling water that has passed through the right cylinder head 53 and the left cylinder head 54 is sent to a water outlet 64. The cooling water that has passed through the water inlet 65 is sent to a right turbocharger 57, a heater 59, a reservoir 60, a radiator 61, an engine oil cooler 62, and an automatic transmission fluid cooler 63.

The cooling water that has passed through the right turbocharger 57 is sent to the water inlet 65. The cooling water that has passed through the heater 59 is sent to the water inlet 65. In the heater 59, the air that is used for the heater of the air conditioner is warmed by the cooling water. The cooling water that has passed through the reservoir 60 is sent to the water inlet 65. The cooling water that has passed through the radiator 61 is sent to the water inlet 65. The cooling water that has passed through the engine oil cooler 62 is sent to the water inlet 65. The cooling water that has passed through the automatic transmission fluid cooler 63 is sent to the water inlet 65.

Part of the cooling water that has passed through the water outlet 64 is directly sent to the water inlet 65 from a bypass flow channel 66. The cooling water that has passed through the water inlet 65 is again sent to the water pump 4.

Actions

In order to use the heater of the air conditioner, it is necessary to send the cooling water that has been warmed by the engine to the heater and warm the air with the cooling water. In other words, the cooling water must be circulated, and thus a water pump must be driven.

In a vehicle comprising an idle stop function, an electric water pump was provided, apart from the water pump driven by the engine, in order to drive the water pump when the engine is stopped. However, providing two water pumps created such problems as increased cost and increased size of the engine cooling system.

In the first embodiment, the water pump 4 that is driven by the engine 3 is driven by another drive source when the engine is stopped. When the water pump 4 is driven by another drive source, it is necessary to cut off the transmission of power between the engine 3 and the water pump 4, which is a high load.

In the first embodiment, the first idler roller 8 is disposed between the engine roller 6 and the water pump roller 7, the second idler roller 9 is disposed between the motor/generator roller 5 and the water pump roller 7, and the third idler roller 10 is disposed between the motor/generator roller 5 and the engine roller 6. In order to cut off the transmission of power between the engine 3 and the water pump 4, it is first necessary to separate the first idler roller 8 from the engine roller 6 and the water pump roller 7. In addition, it is necessary to separate the second idler roller 9 from the motor/generator roller 5 and the water pump roller 7, and the third idler roller 10 from the motor/generator roller 5 and the engine roller 6.

In other words, in order to cut off the transmission of power between the engine 3 and the water pump 4, it is necessary to move at least two idler rollers. By providing an actuator for each of the idler rollers, two actuators become necessary, and there is still the problem of increased cost and the increased size of the linking mechanism 30.

Thus, in the first embodiment, the linking mechanism 30, which supports the rotational shaft of the first idler roller 8 and the rotational shaft of the third idler roller 10, is proved. And, the linking mechanism 30 is driven by a single motor 40 (actuator), and the positions of the first idler roller 8 and the third idler roller 10 are changed. Specifically, the first idler roller 8 is switched between a state in which the idler roller is in contact with, and a state in which the idler roller is separated from, the engine roller 6 and the water pump roller 7, and the third idler roller 10 is switched between a state in which the idler roller is in contact with both, and a state in which the idler roller is separated from at least one of the motor/generator roller 5 and the engine roller 6, by the linking mechanism 30.

Thus, the positions of the first idler roller 8 and the third idler roller 10 can be changed simultaneously with a single motor 40. For this reason, the cost of the auxiliary machine-driving device 1 for a vehicle can be reduced, and the increase in size of the auxiliary machine-driving device 1 for a vehicle can be suppressed.

Driving of the Water Pump by the Motor/Generator

In the first embodiment, the motor/generator 2 is used as another drive source for driving the water pump 4, which was driven by the engine 3, when the engine is stopped. The motor/generator 2 comprises the functions of a starter motor for starting the engine 3 and an alternator for generating power, and also comprises the function of driving the water pump 4.

In order for the motor/generator 2 to fulfill the three functions described above, it is necessary that the motor/generator 2 and the engine 3 be connected to be capable of transmitting power at the time of an engine start and after the engine starts, and that the motor/generator 2 and the engine 3 be disconnected to be incapable of transmitting power when the engine is stopped. This is because if the motor/generator 2 and the engine 3 are connected in order to be capable of transmitting power when the engine is stopped and the water pump 4 is driven by the motor/generator 2, the load on the motor/generator 2 is increased.

It should be noted that at the time of an engine start, when starting the engine 3 with the motor/generator 2, it is conceivable to disconnect the motor/generator 2 from the water pump 4 so that power cannot be transmitted in order to reduce the load on the motor/generator 2. However, since the load of the water pump 4 is not very large, the motor/generator 2 and the water pump 4 may be always connected for torque transmission.

In the first embodiment, the first idler roller 8 is switched between a state in which the idler roller is in contact with, and a state in which the idler roller is separated from, the engine roller 6 and the water pump roller 7, and the third idler roller 10 is switched between a state in which the idler roller is in contact with both, and a state in which the idler roller is separated from at least one of the motor/generator roller 5 and the engine roller 6, by the linking mechanism 30, as described above.

Thus, when the engine is stopped, the water pump 4 can be driven by the motor/generator 2. For this reason, there is no need to provide a separate electric water pump, etc., in addition to the water pump 4 that is driven by the engine 3. Also, the water pump 4 can also be driven using the motor/generator 2 that starts the engine 3 and that generates power. Thus, the heater can be used when the engine is stopped without the addition of another water pump or a drive source for driving the water pump.

Effects (1) The auxiliary machine-driving device for a vehicle comprises an engine 3 that generates drive torque; a water pump 4 (first auxiliary machine) that is driven by the engine 3; a motor/generator 2 that is driven by the engine 3 (second auxiliary machine); an engine roller 6 that integrally rotates with a crankshaft of the engine 3; a water pump roller 7 (first rotating roller) that integrally rotates with a rotating shaft of the water pump 4; a motor/generator roller 5 (second rotating roller) that integrally rotates with a rotating shaft of the motor/generator 2 (second auxiliary machine); a first idler roller 8 disposed between the engine roller 6 and the water pump roller 7; a second idler roller 9 disposed between the water pump roller 7 and the motor/generator roller 5; a third idler roller 10 disposed between the motor/generator roller 5 and the engine roller 6; and a linking mechanism 30 that is driven by a single motor 40 (actuator) and that changes the position of the first idler roller 8 so as to switch between a state in which the first idler roller 8 makes contact with the engine roller 6 and the water pump roller 7 at the outer peripheral surfaces, and a state in which the first idler roller is separated from the engine roller and the water pump roller, and that also changes the position of the second idler roller 9 and/or the third idler roller 10 so as to switch between a state in which at least one of the second idler roller 9 and the third idler roller 10 makes contact, at the outer peripheral surfaces, with two rollers that are adjacent to said at least one roller, and a state in which said at least one roller is separated from the two adjacent rollers. Therefore, the cost of the auxiliary machine-driving device 1 for a vehicle can be reduced, and the increase in size of the auxiliary machine-driving device 1 for a vehicle can be suppressed.

(2) The first idler roller 8 is separated from the engine roller 6 and the water pump roller 7, the third idler roller 10 is separated from the motor/generator roller 5 and the engine roller 6, and the water pump 4 is driven by the motor/generator 2 via the second idler roller 9, when the engine 3 is stopped. Therefore, the heater can be used when the engine is stopped without the addition of another water pump or a drive source.

Other Embodiments

A preferred embodiment of the present invention was described in the foregoing using one embodiment based on drawings, but specific configurations of the present invention are not limited by the embodiment, and changes to the design made without departing from the scope of the invention are also included in the present invention.

Other auxiliary machines that drive synchronously with the engine 3 may be used instead of the water pump 4 of the first embodiment. In addition, the water pump 4 may be driven by another drive source, unlike the first embodiment in which the water pump is driven by the motor/generator 2, when the engine is stopped.

The invention claimed is:

1. An auxiliary machine-driving device for a vehicle, the auxiliary machine-driving device comprising:
    an engine that generates drive torque;
    a first auxiliary machine that is driven by the engine;
    a motor/generator that is driven by the engine;
    an engine roller that integrally rotates with a crankshaft of the engine;
    a first rotating roller that integrally rotates with a rotary shaft of the first auxiliary machine;
    a second rotating roller that integrally rotates with a rotary shaft of the motor/generator;
    a first idler roller that is disposed between the engine roller and the first rotating roller;
    a second idler roller that is disposed between the first rotating roller and the second rotating roller;
    a third idler roller that is disposed between the second rotating roller and the engine roller; and
    a linking mechanism that is driven by one actuator and that simultaneously changes the positions of the first idler roller the third idler roller so as to switch between a state in which the first idler roller makes contact with outer peripheral surfaces of the engine roller and the first rotating roller, and the third idler roller makes contact with outer peripheral surfaces of the engine roller and the second rotating roller, and a state in which the first idler roller is separated from the engine roller and the first rotating roller, and the third idler roller is separated from the engine roller and the second rotating roller,
    the second rotating roller rotates in a direction of rotation in which a wedging effect acts on the third idler roller when starting the engine with a drive torque of the motor/generator, and
    the engine roller rotates in a direction of rotation in which a wedging effect acts on the first idler roller when driving the first auxiliary machine with the drive torque of the engine.

2. The auxiliary machine-driving device as recited in claim 1, wherein
    the first auxiliary machine is a water pump for supplying cooling water to the engine;
    the motor/generator starts the engine and generates power with the drive torque of the engine after the engine starts; and
    the linking mechanism changes the positions of the first idler roller and the third idler roller, separates the first idler roller from the engine roller and the first rotating roller, and separates the third idler roller from the second rotating roller and the engine roller when the engine is stopped and drives the water pump with the motor/generator via the second idler roller.

\* \* \* \* \*